April 10, 1962  C. PASSAGGIO  3,028,758
HYDRAULIC PRESSURE GAUGE
Filed March 25, 1959  2 Sheets-Sheet 1
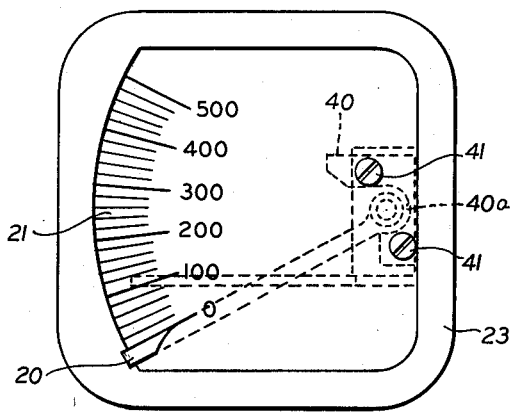
FIG. 1.
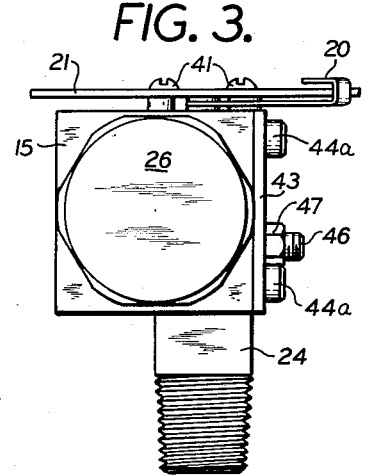
FIG. 3.
FIG. 2.
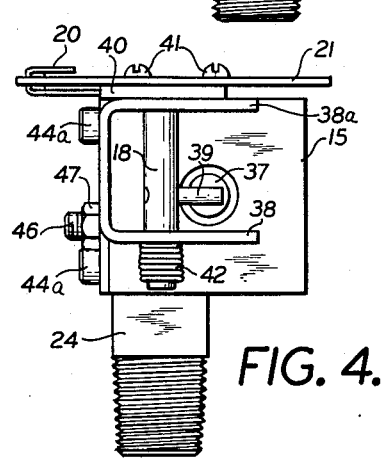
FIG. 4.
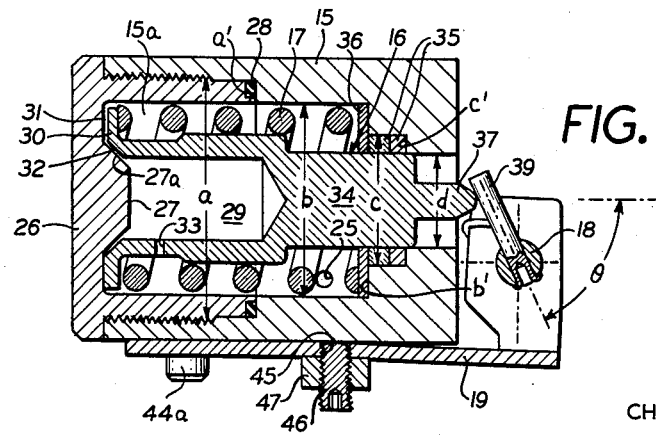
FIG. 5.
INVENTOR
CHARLES PASSAGGIO
BY
ATTORNEYS.

April 10, 1962 C. PASSAGGIO 3,028,758
HYDRAULIC PRESSURE GAUGE
Filed March 25, 1959 2 Sheets-Sheet 2

INVENTOR
CHARLES PASSAGGIO
BY
Byerly, Townsend, Watson & Churchill
ATTORNEYS.

United States Patent Office 3,028,758
Patented Apr. 10, 1962

3,028,758
HYDRAULIC PRESSURE GAUGE
Charles Passaggio, Flushing, N.Y., assignor to Scovill Manufacturing Company, Waterbury, Conn., a corporation of Connecticut
Filed Mar. 25, 1959, Ser. No. 801,966
6 Claims. (Cl. 73—419)

The present invention relates to hydraulic gauges and more particularly to high-pressure gauges of the type wherein the pressure responsive element is a plunger movable in a housing in opposition to the force of a calibrated spring and the movement of the plunger actuates an indicator to move across a graduated plate or dial.

In gauges of the type specified sudden changes in pressure give rise to rapid movements of the plunger and consequently to rapid fluctuation of the indicator, which movements and fluctuations not only impose a strain on the operating parts of the gauge but also render the reading of the pressure at any given instant difficult.

An object of the present invention is to provide a gauge wherein the foregoing objections are overcome. A further object of the invention is to effectively damp the rapid movements of the plunger and the fluctuation of the indicator. A further object of the invention is to provide a gauge mechanism having means wherein after the zero setting of the pointer has been adjusted, the gauge can be calibrated to compensate for variations in the stiffness of the spring without disturbing the zero adjustment.

The foregoing and other objects of the invention as well as certain improvements in the novel arrangement and combination of parts of the gauge will be understood from the detailed description which follows, when considered in connection with the accompanying drawings showing two embodiments, wherein:

FIG. 1 is a plan view of a pressure gauge according to one embodiment of the invention;

FIG. 2 is a side elevation of the gauge shown in FIG. 1 as viewed from the lower side thereof, part of the casing being broken away to show the internal structure;

FIG. 3 is a side elevation of the gauge as viewed from the left hand side of FIG. 2, the casing being omitted;

FIG. 4 is a side elevation of the gauge as viewed from the right hand side of FIG. 2, the casing being omitted;

FIG. 5 is a cross sectional view taken along the line 5—5 on FIG. 2;

Figure 6:
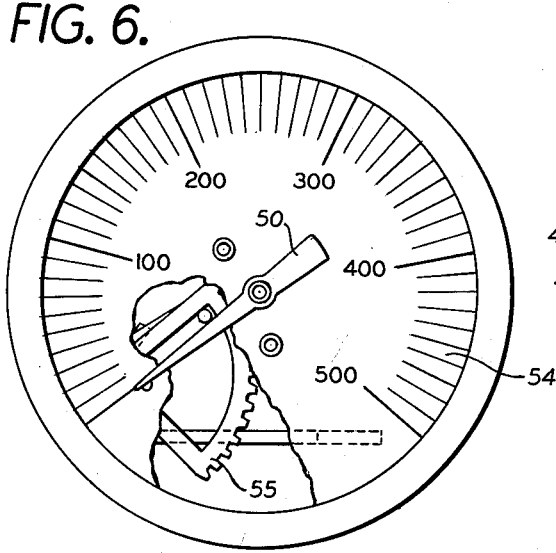
FIG. 6 is a plan view of a second embodiment of the invention.

Referring first to FIGS. 1 to 5 of the drawings showing a first embodiment of the invention, the gauge may be said to consist of a housing 15 having a bore therethrough providing a chamber in which a plunger 16 is movable under fluid pressure against the force of a calibrated helical spring 17, the plunger being adapted to rotate a spindle 18 carried by a stirrup 19 adjustably mounted on the housing 15, the spindle carrying an indicator 20 movable over a graduated plate or dial 21, the entire mechanism being mounted within a casing 22 having a closure top 23 and the housing having projecting from one face thereof a threaded nipple 24, having therethrough a fluid inlet passage 25.

The housing 15 as shown has the form of a rectangular prism and the bore therethrough has different diameters $a$, $b$, $c$, and $d$ providing shoulders $a'$, $b'$, and $c'$ therein. The bore having the diameter $a$ is internally threaded and accommodates a closure cap 26 formed with a re-entrant projection 27, having a conical wall 27a, the inner end of the cap seating upon a packing gasket 28 to provide the housing with a chamber 15a.

The plunger 16 is formed with a hollow chamber 29 terminating at its open end in an outward flange 30 preferably of less diameter than the bore $b$, the outer surface of the flange being formed with one or more grooves or slots 31, and with a conical surface 32 radially spaced from the conical wall 27a on the closure cap to provide a fluid communicating passage between the chamber 15a in the housing and the chamber 29 in the plunger. Supplemental or alternative to the aforementioned communicating passage, the wall of the plunger may be provided with an orifice 33. Inwardly of the chamber 29, the plunger has a solid wall 34 having a diameter to move slidably within the bore $d$ of the housing with a leak-tight fit provided by packing gaskets 35 seated on shoulder $c'$ and held in place by a washer 36 seating on the shoulder $b'$ and held thereagainst by one end of the spring 17, the other end of which bears against the flange 30 on the plunger. At its extreme inner end the plunger is formed with an axially projecting pin 37.

The spindle 18 is rotatably mounted in a pair of arms 38, 38a formed integrally on the stirrup 19 and to said spindle is fixedly secured a radially extending arm or projection 39 for engagement and movement by the pin 37 of the plunger. Mounted coaxially on one end of the spindle 18 is the indicator 20 which extends rearwardly of the graduated plate 21 and at its outer end is reversely bent so that the free end of the indicator will overlie the graduations on the dial. To provide clearance for movement of the indicator between the graduated plate and the arm 38a of the stirrup, a spacer plate 40 is interposed between the arm 38a and said graduated plate and is formed with a clearance groove 40a. The graduated plate 21 and the spacer plate 40 are secured to the arm 38a of the stirrup by screws 41. To maintain the spindle 18 in its normal position with the arm 39 in contact with the end of the pin 37, a coil tension spring 42 is mounted on the spindle and anchored over the edge of the arm 38, as best shown in FIG. 2.

The stirrup 19 has a flat substantially T-shaped arm 43 extending from the arm 38, the cross head of the T being formed with a pair of elongated parallel slots 44 through which extend screws 44a threaded into the housing 15 for adjusting the stirrup longitudinally in relation to the housing; the upright bar of the T-shaped arm intermediate its ends being formed with a screw threaded opening 45 in which is engaged a screw 46 having mounted thereon a lock-nut 47.

Figure 9:
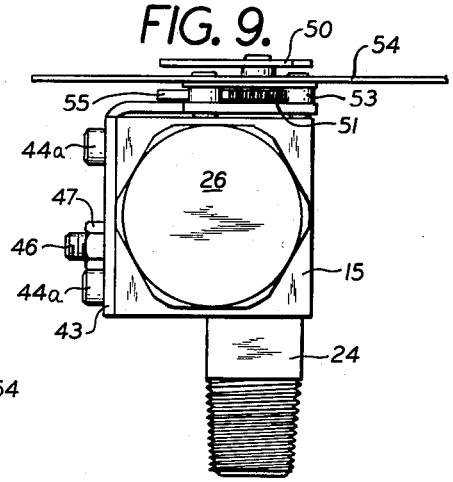
FIG. 9 is a side elevation of the gauge as viewed from the right hand side of FIG. 7.
Figure 7:
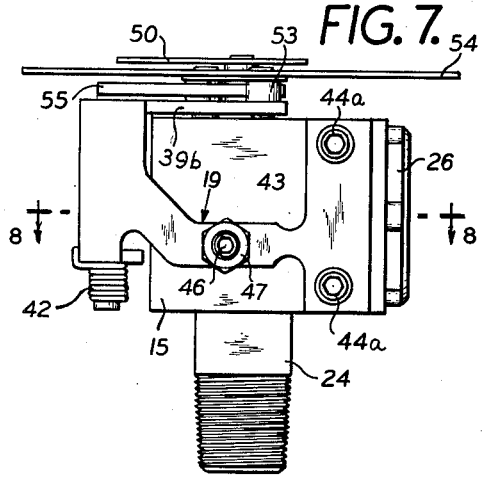
FIG. 7 is a side elevation of the gauge shown in FIG. 6 as viewed from the upper end thereof, the casing being omitted.
Figure 10:
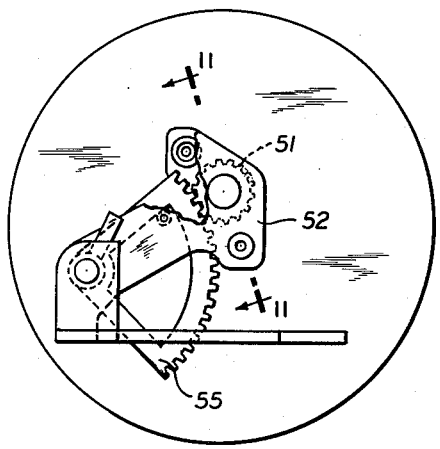
FIG. 10 is a plan view of the indicator multiplying means of the gauge shown in FIG. 6.
Figure 8:
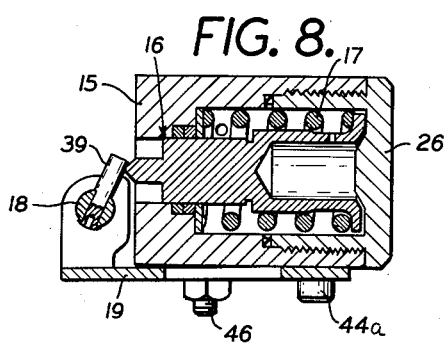
FIG. 8 is a cross sectional view taken along the line 8—8 on FIG. 7.
Figure 11:
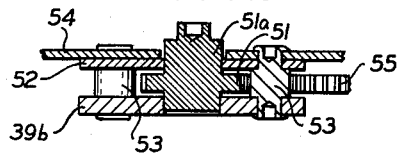
FIG. 11 is a cross sectional view taken along the line 11—11 on FIG. 10.

Referring now to FIGS. 6 to 11 of the drawings it may be stated that the construction of the gauge in this second embodiment of the invention primarily differs from the first embodiment, in the mountings of the indicator and graduated plate in relation to the housing 29 and in the provision of movement multiplying means for the indicator. Instead of the indicator being directly mounted on the spindle 18, the indicator 50 is coaxially mounted on a hub 51a of a pinion 51 and said pinion is rotatably supported in an arm 39b on the stirrup and in a supporting plate 52, and said arm and plate are held in spaced relation by a pair of spacers 53 riveted to said arm 39b and over the graduated plate or dial 54 as best shown in FIGS. 9–11. The teeth of the pinion 51 are in mesh with the teeth of a gear sector 55 which is fixedly carried by the spindle 18 to be movable therewith when rotated by the plunger 16.

In the operation of both embodiments of the invention fluid under pressure is introduced into the chamber 15a of the housing through the inlet passage 25 and by virtue of the passages 31, 32 and/or 33, said fluid enters the chamber 29 in the piston and builds up pressure therein to move the piston against the force of the calibrated spring 17. The rate at which the piston will move is determined by (1) the spring force; (2) the rate of fluid flow from the housing chamber to the piston chamber; and (3) the effective diameter of the piston exposed to fluid pressure.

As a relatively large volume of fluid must pass from the housing chamber to the piston chamber to effect a small change in piston position it will be readily understood in view of the restricted passages providing for the movement of fluid between said chambers that an effective damping will take place when a change in pressure occurs and thus reduce shock loads on the various moving parts.

As the piston is moved by the fluid pressure, the pin 37 on the plunger which is at all times in engagement with the arm or projection 39, rotates the spindle 18 and in turn moves the indicator across the graduated scale.

In the embodiment of the gauge shown in FIGS. 1 to 5, it will be apparent that an angular rotation of the arm 39 will provide an equal angular or arcuate movement of the indicator across the graduated plate.

In the embodiment shown in FIGS. 5 to 11 rotation of the spindle 18 will rotate the gear sector 55 which actuates pinion 51, hence the gear ratio between the gear sector and the pinion provides a movement multiplying means for the indicator over the dial. Thus a small angular movement of the arm 39 is multiplied by the gear ratio between the sector and the pinion resulting in a large angular movement of the indicator 50.

With each of the embodiments disclosed it will be apparent that at assembly, the indicator 20 or 50 is adjusted to zero and can be calibrated to compensate for a "stiff" and a "weak" spring 17. This is accomplished in the following way. As the movement of the indicator is directly dependent upon the mounting of the stirrup, the indicator may be brought to zero position by the adjustment of the stirrup on the housing through the agency of the elongated slots 44 and screws 44a. Once this zero adjustment has been made it need not be changed when calibrating the gauge for either a stiff or weak spring by adjustment of the screw 46 to deflect the spindle carrying end of the stirrup, and then locking the screw in adjusted position by the lock-nut 47. The vertical shift of the spindle axis (due to the horizontal change) keeps the angle θ essentially constant, which is a necessary condition for not disturbing zero setting during calibration, which may be carried out in the following manner:

(1) The gauge is attached to a fluid pressure source.

(2) The plunger is actuated by varying the pressure from zero to maximum and back to zero.

(3) The zero position is established by moving the stirrup along its slots until zero is indicated and the stirrup locked in said position.

(4) A known pressure, approximately one half maximum pressure range of the gauge is then applied.

(5) The calibration is then made by adjusting screw 46 until correct pressure is indicated and said screw is then locked by the nut 47.

(6) The gauge is then checked throughout the full pressure range of the gauge.

Although two embodiments of the invention have been illustrated and described it is to be understood that changes in details of construction and relationship of parts in the gauge structures may be made within the range of engineering skill without departing from the spirit of the invention as hereinafter claimed.

What I claim is:

1. An hydraulic gauge comprising a housing having a fluid inlet opening leading to a sealed chamber within the housing, said chamber having a cylindrical bore portion of reduced area, a plunger movable in said housing chamber and having at one end a piston portion movable in the chamber bore portion of reduced area and at its opposite end a chambered portion facing away from said piston portion and a restricted passage leading into said chambered portion for establishing fluid communication between the housing chamber and the plunger chamber, the plunger at one end being exposed to ambient pressure acting on an effective area equal to the cross-sectional area of the cylindrical bore portion in the housing chamber of reduced area, while on its other end it is exposed to the pressure inside the housing chamber, spring means normally biasing the plunger to move in the housing in a direction away from the bore portion of reduced area, a graduated plate carried by the housing, an indicator movable over said graduated plate and means movable by the plunger in response to fluid pressure within the plunger chamber in opposition to the force of the spring means for moving the indicator over the graduated plate.

2. A pressure gauge according to claim 1, wherein the graduated plate and the means movable by the plunger are carried by the housing and are adjustable as a unit relatively to the housing.

3. A pressure gauge according to claim 2, wherein the graduated plate and the means for moving the indicator are carried by a stirrup mounted adjustably on the housing.

4. A pressure gauge according to claim 3, wherein the stirrup supports a spindle having a radially extending projection in engagement with the plunger.

5. A pressure gauge according to claim 3, wherein the stirrup supports a spindle having a radially extending projection for engagement by the plunger and the indicator is mounted coaxially on the spindle.

6. A pressure gauge according to claim 2, wherein the means for moving the indicator and the graduated plate are carried by a stirrup adjustably mounted on the housing, the stirrup supports a spindle having a radially extending projection for engagement by the plunger, and the indicator is connected to the spindle through a movement-multiplying means comprising a gear sector mounted on the spindle and a pinion in mesh with the gear sector mounted on the stirrup to be movable therewith.

References Cited in the file of this patent

UNITED STATES PATENTS

| | | |
|---|---|---|
| 872,808 | Foster | Dec. 3, 1907 |
| 1,403,329 | Low | Jan. 10, 1922 |
| 1,938,492 | Moller | Dec. 5, 1933 |
| 2,116,628 | Heise | May 10, 1938 |
| 2,498,366 | Greer et al. | Feb. 21, 1950 |

FOREIGN PATENTS

| | | |
|---|---|---|
| 243,086 | Great Britain | Nov. 26, 1925 |
| 724,058 | Great Britain | Feb. 16, 1955 |